United States Patent
Matsuura et al.

(10) Patent No.: US 9,419,555 B2
(45) Date of Patent: Aug. 16, 2016

(54) SYNCHRONOUS MACHINE CONTROL APPARATUS

(71) Applicant: MITSUBISHI ELECTRIC CORP., Chiyoda-ku, Tokyo (JP)

(72) Inventors: Daiki Matsuura, Chiyoda-ku (JP); Takahiko Kobayashi, Chiyoda-ku (JP); Noriyuki Wada, Chiyoda-ku (JP); Kiyoharu Anzai, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 305 days.

(21) Appl. No.: 14/074,874

(22) Filed: Nov. 8, 2013

(65) Prior Publication Data

US 2014/0340010 A1 Nov. 20, 2014

(30) Foreign Application Priority Data

May 17, 2013 (JP) .................................. 2013-104727

(51) Int. Cl.
  *H02P 21/14* (2016.01)
  *H02P 6/14* (2016.01)
  *H02P 21/06* (2016.01)

(52) U.S. Cl.
  CPC .............. *H02P 21/141* (2013.01); *H02P 21/06* (2013.01)

(58) Field of Classification Search
  CPC .................................... H02P 6/14; H02P 21/14
  USPC ................................ 318/400.01, 400.13, 700
  See application file for complete search history.

(56) References Cited

U.S. PATENT DOCUMENTS

| | | | | |
|---|---|---|---|---|
| 7,852,039 B2 * | 12/2010 | Kinpara | ................. | H02P 21/14 318/720 |
| 8,525,454 B2 * | 9/2013 | Kimpara | ............... | H02P 29/022 318/400.02 |
| 2006/0012328 A1 * | 1/2006 | Yasukawa | ............... | H02P 6/142 318/719 |

(Continued)

FOREIGN PATENT DOCUMENTS

| JP | 2001-008486 A | 1/2001 |
|---|---|---|
| JP | 2007-259675 A | 10/2007 |

(Continued)

OTHER PUBLICATIONS

Japanese Office Action (Notification of Reason for Refusal) issued Jun. 24, 2014, Patent Application No. 2013-104727

*Primary Examiner* — Kawing Chan
(74) *Attorney, Agent, or Firm* — Sughrue Mion, PLLC; Richard C. Turner

(57) ABSTRACT

A synchronous machine control apparatus for correcting a rotor position error that is a difference between a rotor position of a synchronous machine and a rotor position detected by a position detection unit is provided with a current control device for performing control in such a way that respective current command values and respective current detection values in a generation direction ($\gamma$ axis) of an armature interlinked magnetic flux and in a direction perpendicular ($\delta$ axis) to the generation direction of the armature interlinked magnetic flux coincide with each other and with a magnetic flux calculation device for calculating a phase of an armature interlinked magnetic flux, based on an armature current detection value of the synchronous machine and an armature voltage command value therefor; the rotor position error is corrected based on the $\gamma\delta$-axis current command values and a phase of the armature interlinked magnetic flux.

6 Claims, 6 Drawing Sheets

(56) References Cited

U.S. PATENT DOCUMENTS

| | | | |
|---|---|---|---|
| 2007/0241720 A1 | 10/2007 | Sakamoto et al. | |
| 2008/0297078 A1* | 12/2008 | Iwasaki | H02P 21/0035 318/400.02 |
| 2010/0045218 A1* | 2/2010 | Tomigashi | H02P 6/183 318/400.02 |
| 2010/0127648 A1* | 5/2010 | Akiyama | H02P 21/0032 318/400.11 |
| 2011/0148336 A1* | 6/2011 | Hayashi | H02P 21/0003 318/400.04 |
| 2011/0309781 A1* | 12/2011 | Tomigashi | H02P 21/13 318/504 |
| 2013/0033207 A1 | 2/2013 | Satou et al. | |
| 2013/0088179 A1* | 4/2013 | Kobayashi | H02P 21/141 318/400.02 |
| 2013/0249450 A1* | 9/2013 | Kwon | H02P 21/0039 318/400.02 |

FOREIGN PATENT DOCUMENTS

| | | |
|---|---|---|
| JP | 2008-278606 A | 11/2008 |
| JP | 2010-041868 A | 2/2010 |
| JP | 2013-034281 A | 2/2013 |
| JP | 2013-059258 A | 3/2013 |

* cited by examiner

SYNCHRONOUS MACHINE CONTROL APPARATUS

BACKGROUND OF THE INVENTION

1. Field of the Invention

The present invention relates to a synchronous machine control apparatus provided with an electric-power conversion unit for rotation-driving a synchronous machine and particularly to a synchronous machine control apparatus that corrects an error between the true rotor position of a synchronous machine and a rotor position detected by a position detection unit.

2. Description of the Related Art

When in controlling a synchronous machine, there exists an error between the true rotor position of the synchronous machine and a rotor position detected by a position detector (referred to as a rotor position error, hereinafter), the synchronous machine cannot be controlled in such away as to have desired torque. Therefore, this error needs to be detected and corrected.

As an example of synchronous machine control apparatus in which such a problem is solved, a method has been proposed in which under the condition that the load torque is constant, a current command that makes the armature current minimum is searched and the rotor position error is calculated from the searched current command (for example, refer to Patent Document 1).

In addition, a method has been proposed in which there is provided a comparator that compares the U-phase voltage and the W-phase voltage of respective rotor armature windings and makes an output clock signal fall when detecting a point where the U-phase voltage and the W-phase voltage cross each other (the U-phase voltage rises/the W-phase voltage falls) and in which the average value of a predetermined number of position-detector outputs to be obtained each time the output clock signal falls is calculated so that the rotor position error is calculated (for example, refer to Patent Document 2).

[Patent Document 1] Japanese Patent Application Laid-Open No. 2001-8486

[Patent Document 2] Japanese Patent Application Laid-Open No. 2008-278606

However, the synchronous machine control apparatus disclosed in Patent Document 1 has a problem that it takes a long time to search a current command, for calculating a rotor position error, that makes the armature current minimum under the condition that the load torque is constant. The synchronous machine control apparatus disclosed in Patent Document 2 has a problem that for the purpose of calculating a rotor position error, a dedicated circuit is required.

SUMMARY OF THE INVENTION

The present invention has been implemented in order to solve the problems in the foregoing conventional technologies; the objective thereof is to provide a synchronous machine control apparatus that can correct a rotor position error without searching a current command or without any dedicated circuit.

A synchronous machine control apparatus, according to the present invention, for correcting a rotor position error that is a difference between a rotor position of a synchronous machine and a rotor position detected by a position detection unit for detecting a rotor position of the synchronous machine is provided with a current control device for performing control in such a way that respective current command values and respective current detection values in a generation direction of an armature interlinked magnetic flux and in a direction perpendicular to the generation direction of the armature interlinked magnetic flux coincide with each other, a magnetic flux calculation device for calculating a phase of an estimated armature interlinked magnetic flux, based on an armature current detection value of the synchronous machine and an armature voltage command value therefor, and a rotor position error calculation device for calculating the rotor position error from a phase of an estimated armature interlinked magnetic flux calculated by the magnetic flux calculation device; a rotor position error that is a difference between a rotor position of the synchronous machine and a rotor position detected by the position detection unit is corrected by use of a rotor position error calculated by the rotor position error calculation device.

A synchronous machine control apparatus according to the present invention makes it possible to correct a rotor position error without taking a time for searching a current command value and without any dedicated circuit.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, preferred embodiments of a synchronous machine control apparatus according to the present invention will be explained with reference to the drawings.

Embodiment 1

Figure 1:
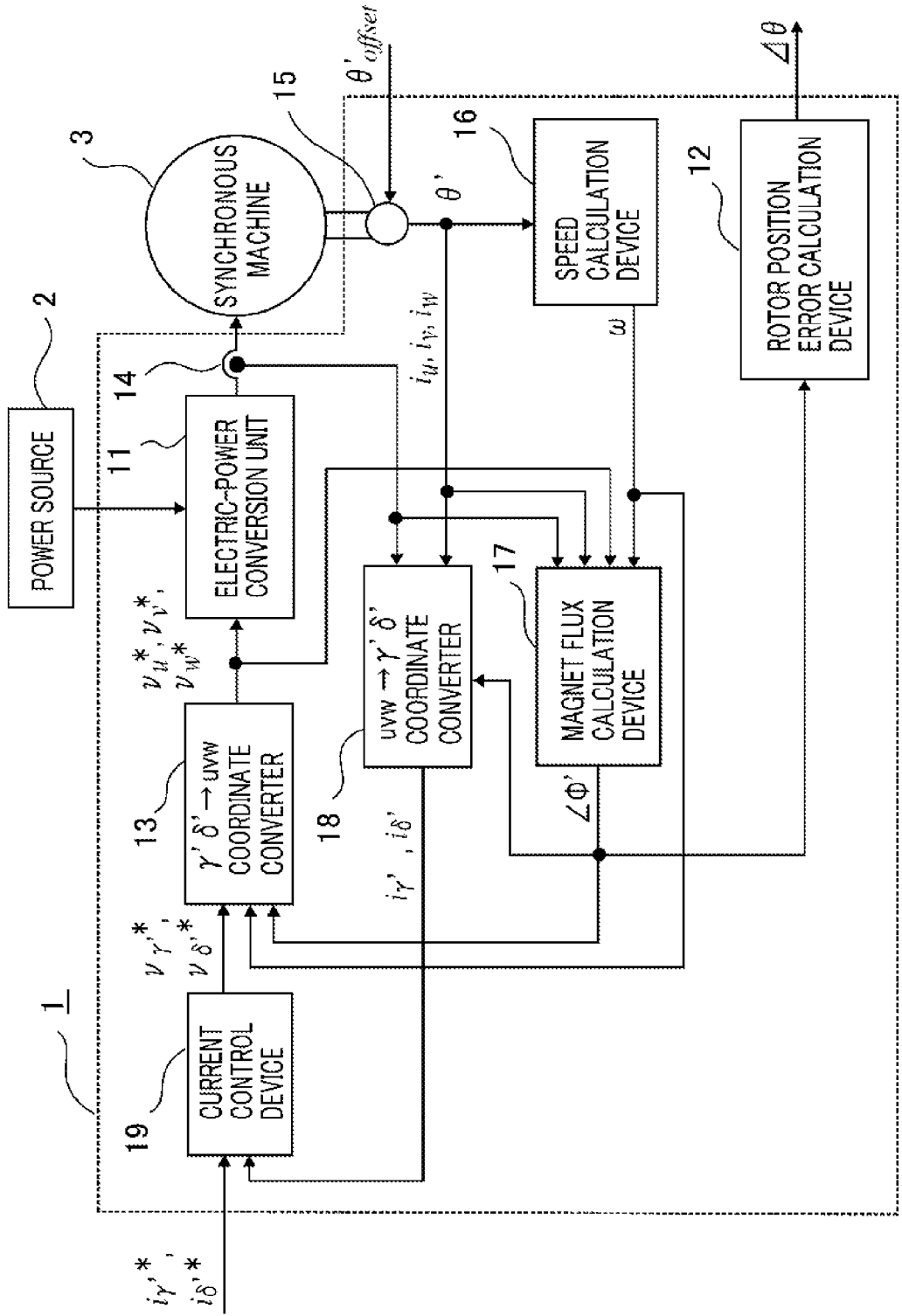
FIG. 1 is a configuration diagram illustrating an example of synchronous machine control system including a synchronous machine control apparatus, a power source, and a synchronous machine, according to Embodiment 1 of the present invention.

FIG. 1 is a configuration diagram illustrating an example of synchronous machine control system including a synchronous machine control apparatus 1, a power source 2, and a synchronous machine 3, according to Embodiment 1 of the present invention. Hereinafter, there will be explained the configuration of a synchronous machine control apparatus 1 according to Embodiment 1 and the functions of the constituent elements thereof.

The synchronous machine control apparatus 1 is provided with an electric-power conversion unit 11, a rotor position error calculation device 12, a γ'δ' to uvw coordinate converter 13, a current detection unit 14, a position detection device 15 as a position detection unit, a speed calculation device 16, a magnetic flux calculation device 17, a uvw to γ'δ' coordinate converter 18, and a current control device 19.

At first, the configuration of the synchronous machine control apparatus 1 will be explained in sequence from the output side of the electric-power conversion unit 11; then, there will be explained the flow of generation of voltage commands at the input side of the electric-power conversion unit 11. After that, there will be explained a method in which the rotor position error calculation device 12 is utilized so as to correct a rotor position error.

In the configuration of the synchronous machine control apparatus 1, according to Embodiment 1, for driving the synchronous machine 3, the armature winding of the synchronous machine 3 is connected with the electric-power conversion unit 11 including devices, for example, an inverter having a function of converting electric power supplied by the power source 2 into multi-phase AC electric power. The electric-power conversion unit 11 applies voltages to the synchronous machine 3, based on voltage commands vu*, vv* and vw* obtained by the γ'δ' to uvw coordinate converter 13 having an after-mentioned configuration, and drives the synchronous machine 3. As a result, an output current is produced in the armature winding of the synchronous machine 3. The power source 2 is a power supply unit that outputs a DC voltage or is a battery; it may be the one that obtains a DC voltage, through a well-known converter, from a single-phase or three-phase AC power source.

The current in the armature winding (referred to as an armature current, hereinafter), which is the output current of the synchronous machine 3, is detected by the current detection unit 14 such as a current sensor. In the case where the synchronous machine 3 is a three-phase electric rotating machine, the current detection unit 14 may be configured in such a way as to detect all of the armature currents of three phases; alternatively, the current detection unit 14 may be configured in such a way that the output currents of two phases are detected so that the output current iw of one phase (e.g., W phase) is obtained through the relationship [iw=−iu−iv], by use of the detected output currents of two phases iu and iv. Moreover, the current detection unit 14 may be formed by use of a well-known technology in which the output current is detected from a DC link current that flows from the power source 2 to the electric-power conversion unit 11, instead of being formed through a method in which the current of each phase is directly detected.

The position detection device 15 detects the rotor position of the synchronous machine 3 by use of a well-known resolver, an encoder, or the like. Here, θ and θ' denote the true rotor position of the synchronous machine 3 and the rotor position detected by the position detection device 15, respectively. The position detection device 15 can reduce the value of θ' by θ' offset, by setting an origin correction value θ' offset. The speed calculation device 16 applies a differential operation to θ' so as to calculate an electric angular velocity ω of the synchronous machine 3.

In Embodiment 1, in the case where the synchronous machine 3 is a permanent-magnet synchronous machine, the permanent-magnet magnetic flux is defined as magnetic field flux, and in the case where the synchronous machine 3 is a coil-magnetic-field synchronous machine, the magnetic flux generated when a current is applied to the magnetic-field winding is defined as magnetic field flux. The true rotor position θ of the synchronous machine 3 denotes the N-pole-direction angle, of the magnetic field flux, with respect to an axis that is set by regarding the armature winding of u-phase as a reference; the d axis of a rotating biaxial coordinate system (expressed as a d-q axis, hereinafter) that rotates at the rotation speed (electric angular frequency ω) of the synchronous machine 3 is set along the N-pole direction of the magnetic field flux, and the explanation below will follow this definition. The q axis is set in a direction that is 90° advanced from and perpendicular to the d axis.

In contrast, the direction of the rotor position detected by the position detection device 15 is defined as a d' axis; a direction that is 90° advanced from and perpendicular to the d' axis is defined as a Q' axis; then, the d' axis and the q' axis are collectively expressed as a d'q' axis.

A direction in which the armature interlinked magnetic flux is generated is defined as a γ axis; a direction that is 90° advanced from and perpendicular to the γ axis is defined as a δ axis; then, the γ axis and the δ axis are collectively expressed as a γδ axis. In contrast, the direction of the armature interlinked magnetic flux calculated by the after-mentioned magnetic flux calculation device 17 is defined as a γ' axis; a direction that is 90° advanced from and perpendicular to the γ' axis is defined as a δ' axis; then, the γ' axis and the δ' axis are collectively expressed as a γ'δ' axis.

The magnetic flux calculation device 17 calculates an estimation value of the armature interlinked magnetic flux (hereinafter, expressed as estimated armature interlinked magnetic flux), based on voltage commands vu*, vv*, and vw* of the phases u, v, and w obtained from the γ'δ' to uvw coordinate converter 13, described later, current detection values iu, iv, and iw of the phases u, v, and w obtained from the current detection unit 14, θ' obtained from the position detection device 15, and the electric angular velocity ω obtained from the speed calculation device 16; specifically, the magnetic flux calculation device 17 estimates a phase ∠Φ' of the estimated armature interlinked magnetic flux. The phase ∠Φ' of the estimated armature interlinked magnetic flux denotes the angle of the direction (the γ'-axis direction) of the estimated armature interlinked magnetic flux with respect to the d' axis.

Figure 2:
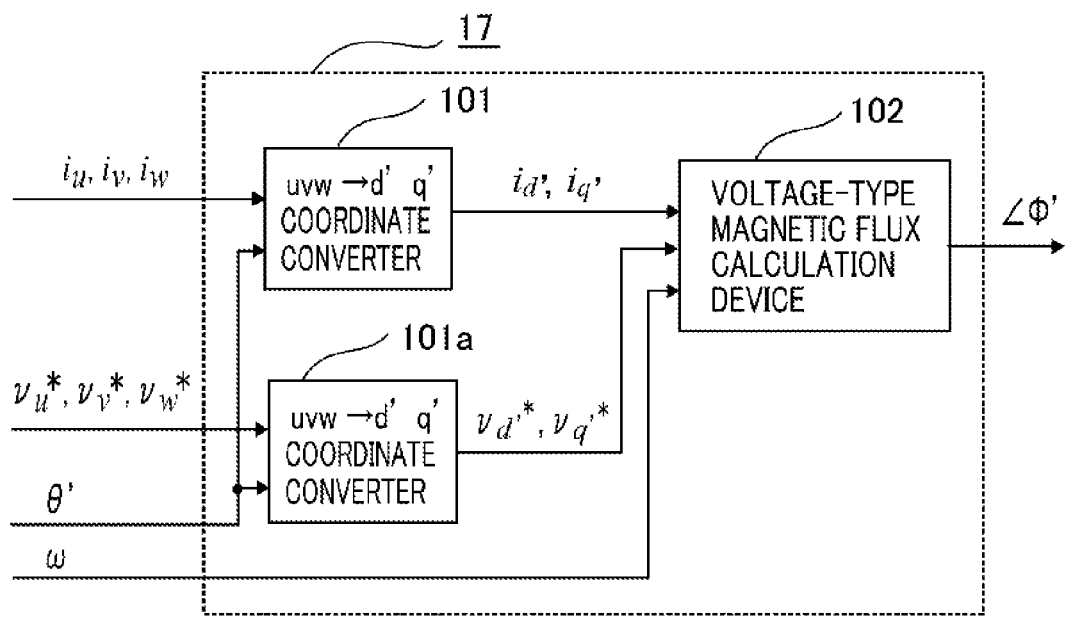
FIG. 2 is a diagram illustrating an example of configuration of a magnetic flux calculation device according to Embodiment 1 of the present invention.

FIG. 2 is an example of configuration diagram of the magnetic flux calculation device 17 according to Embodiment 1. In FIG. 2, through calculation according to the equation (1) below, a uvw to d'q' coordinate converter 101a converts the voltage commands vu*, vv*, and vw* into d'q'-axis voltage command values vd'* and vq'*, with respect to θ'.

$$\begin{pmatrix} v_{d'}^* \\ v_{q'}^* \end{pmatrix} = \begin{pmatrix} \cos\theta' & \sin\theta' \\ -\sin\theta' & \cos\theta' \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} v_u^* \\ v_v^* \\ v_w^* \end{pmatrix} \quad (1)$$

Through calculation according to the equation (2) below, a uvw to d'q' coordinate converter 101 converts the output currents iu, iv, and iw of the synchronous machine 3 into d'q'-axis current detection values id' and iq', with respect to θ'.

$$\begin{pmatrix} i_{d'} \\ i_{q'} \end{pmatrix} = \begin{pmatrix} \cos\theta' & \sin\theta' \\ -\sin\theta' & \cos\theta' \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} i_u \\ i_v \\ i_w \end{pmatrix} \quad (2)$$

A voltage-type magnetic flux calculation device 102 firstly calculates d'q'-axis estimated interlinked magnetic flux Φd' and Φq', through calculation according to the equation (3).

$$\begin{cases} \Phi_{d'} = \frac{1}{\omega}(v_{q'}^* - Ri_{q'}) \\ \Phi_{q'} = -\frac{1}{\omega}(v_{d'}^* - Ri_{d'}) \end{cases} \quad (3)$$

Then, through calculation according to the equation (4), the voltage-type magnetic flux calculation device 102 calculates the phase ∠Φ' of the estimated armature interlinked magnetic flux from the d'q'-axis estimated interlinked magnetic flux Φd' and Φq' and outputs it.

$$\angle\Phi' = \tan^{-1}\left(\frac{\Phi_{q'}}{\Phi_{d'}}\right) \quad (4)$$

Heretofore, the operation of the output side of the electric-power conversion unit 11 has been explained. Next, there will be explained the flow of generation of the voltage commands at the input side of the electric-power conversion unit 11.

Through calculation according to the equation (5) below, a uvw to γ'δ' coordinate converter 18 converts the output currents iu, iv, and iw of the synchronous machine 3 into γ'δ'-axis current detection values iγ' and iδ'.

$$\begin{pmatrix} i_{\gamma'} \\ i_{\delta'} \end{pmatrix} = \quad (5)$$

$$\begin{pmatrix} \cos(\theta' + \angle\Phi') & \sin(\theta' + \angle\Phi') \\ -\sin(\theta' + \angle\Phi') & \cos(\theta' + \angle\Phi') \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} i_u \\ i_v \\ i_w \end{pmatrix}$$

Based on the difference between γ'δ'-axis current command values iγ'* and iδ'* and the γ'δ'-axis current detection values iγ' and iδ', the current control device 19 performs proportional-integral control (PI control) expressed in the equation (6) below so as to calculate γ'δ'-axis voltage commands vγ'* and vδ'*.

$$\begin{cases} v_{\gamma'}^* = \left(K_{p\gamma'} + \frac{K_{i\gamma'}}{s}\right)(i_{\gamma'}^* - i_{\gamma'}) \\ v_{\delta'}^* = \left(K_{p\delta'} + \frac{K_{i\delta'}}{s}\right)(i_{\delta'}^* - i_{\delta'}) \end{cases} \quad (6)$$

Here, Kpγ' is a current control γ'-axis proportional gain, Kiγ' is a current control γ'-axis integral gain, Kpδ' is a current control δ'-axis proportional gain, and Kiδ' is a current control δ'-axis integral gain.

The γ'δ' to uvw coordinate converter 13 converts the γ'δ'-axis voltage command values vγ'* and vδ'* into the voltage commands vu*, vv*, and vw* of the phased of u, v, and w, through calculation according to the equation (7) below.

$$\begin{pmatrix} v_u^* \\ v_v^* \\ v_w^* \end{pmatrix} = \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos(\theta' + \angle\Phi') & -\sin(\theta' + \angle\Phi') \\ \sin(\theta' + \angle\Phi') & \cos(\theta' + \angle\Phi') \end{pmatrix} \begin{pmatrix} v_{\gamma'}^* \\ v_{\delta'}^* \end{pmatrix} \quad (7)$$

In this regard, however, it may be allowed that in the equation (7), considering a control calculation delay time (waste time) until the control calculation based on the output currents iu, iv, and iw of the synchronous machine 3 detected by the current detection unit 14 is reflected on the voltages vu, vv, and vw of the three phased outputted from the electric-power conversion unit 11, the coordinate conversion is performed with a phase obtained by correcting (θ+∠Φ) by a phase correction amount θd2 based on the control calculation delay time.

As described above, the electric-power conversion unit 11 applies the voltages vu, vv, vw to the synchronous machine 3, based on the voltage commands vu*, vv* and vw*.

Heretofore, the operation of the input side of the electric-power conversion unit 11 has been explained. Next, the processing contents of the rotor position error calculation device 12 will be explained.

The rotor position error calculation device 12 calculates a rotor position error Δθ from the phase ∠Φ' of the estimated armature interlinked magnetic flux. Based on the true rotor position θ of the synchronous machine 3 and the rotor position θ' detected by the position detection device 15, the rotor position error Δθ is given by the equation (8) below.

$$\Delta\theta = \theta' - \theta \quad (8)$$

Hereinafter, there will be explained a method through which the rotor position error calculation device 12 calculates the rotor position error Δθ. By substituting the equation (3) for the equation (4), the equation (9) is derived.

$$\angle\Phi' = \tan^{-1}\left(-\frac{v_{d'}^* - Ri_{d'}}{v_{q'}^* - Ri_{q'}}\right) \quad (9)$$

Figure 3:
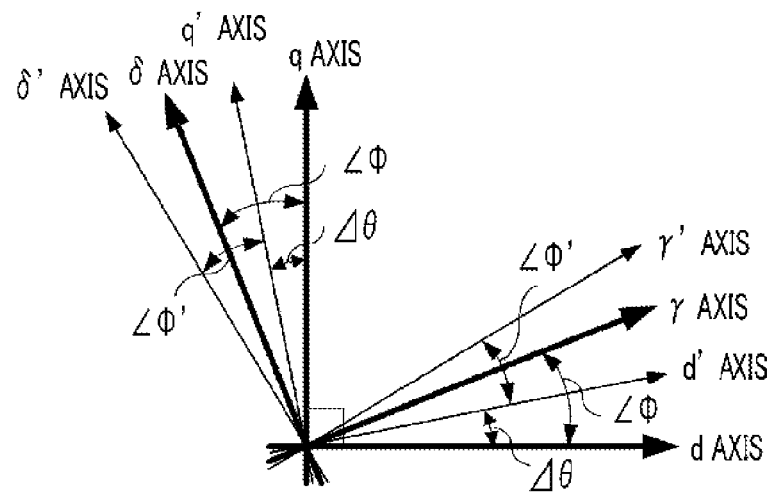
FIG. 3 is a chart representing the relationship among the axes dq, d'q', γδ, and γ'δ' according to Embodiment 1 of the present invention.

FIG. 3 represents the relationship among the dq-axis, the d'q'-axis, the γδ-axis, and the γ'δ'-axis. As can be seen in FIG. 3, the d'q' axis is advance by Δθ from the dq axis; therefore, the d'q'-axis voltage command values vd'* and vq'* are given by the equation (10), by use of Δθ and dq-axis voltage command values vd* and vq*.

$$\begin{cases} v_{d'}^* = v_d^* \cos\Delta\theta + v_q^* \sin\Delta\theta \\ v_{q'}^* = -v_d^* \sin\Delta\theta + v_q^* \cos\Delta\theta \end{cases} \quad (10)$$

The d'q'-axis current detection values id' and iq' are given by the equation (11), by use of Δθ and dq-axis current detection values id and iq.

$$\begin{cases} i_{d'}^* = i_d^* \cos\Delta\theta + i_q^* \sin\Delta\theta \\ i_{q'}^* = -i_d^* \sin\Delta\theta + i_q^* \cos\Delta\theta \end{cases} \quad (11)$$

The true phase $\angle\Phi$ of the armature interlinked magnetic flux is given by the equation (12) below.

$$\angle\Phi = \tan^{-1}\left(\frac{\Phi_q}{\Phi_d}\right) \quad (12)$$

In the equation (12), $\Phi d$ and $\Phi q$ are d-axis interlinked magnetic flux and q-axis interlinked magnetic flux, respectively, and are given by the equation (13) below.

$$\begin{cases} \Phi_d = \frac{1}{\omega}(v_q^* - Ri_q) \\ \Phi_q = -\frac{1}{\omega}(v_d^* - Ri_d) \end{cases} \quad (13)$$

By substituting the equations (10) and (11) for the equation (9), the equation (14) is derived.

$$\angle\Phi' = \tan^{-1}\left\{-\frac{(v_d^* - Ri_d)\cos\Delta\theta + (v_q^* - Ri_q)\sin\Delta\theta}{-(v_d^* - Ri_d)\sin\Delta\theta + (v_q^* - Ri_q)\cos\Delta\theta}\right\} \quad (14)$$

$$= \tan^{-1}\left\{\frac{-\frac{1}{\omega}(v_d^* - Ri_d)\cos\Delta\theta - \frac{1}{\omega}(v_q^* - Ri_q)\sin\Delta\theta}{-\frac{1}{\omega}(v_d^* - Ri_d)\sin\Delta\theta + \frac{1}{\omega}(v_q^* - Ri_q)\cos\Delta\theta}\right\}$$

By substituting the equation (13) for the equation (14), the equation (15) is derived.

$$\angle\Phi' = \tan^{-1}\left(\frac{\Phi_q\cos\Delta\theta - \Phi_d\sin\Delta\theta}{\Phi_q\sin\Delta\theta + \Phi_d\cos\Delta\theta}\right) \quad (15)$$

$$= \tan^{-1}\left(\frac{\frac{\Phi_q}{\Phi_d}\cos\Delta\theta - \sin\Delta\theta}{\frac{\Phi_q}{\Phi_d}\sin\Delta\theta + \cos\Delta\theta}\right)$$

The equation (16) is derived from the equation (12).

$$\frac{\Phi_q}{\Phi_d} = \tan\angle\Phi \quad (16)$$

By substituting the equation (16) for the equation (15), the equation (17) is derived.

$$\angle\Phi' = \tan^{-1}\left(\frac{\tan\angle\Phi\cos\Delta\theta - \Phi_d\sin\Delta\theta}{\tan\angle\Phi\sin\Delta\theta + \Phi_d\cos\Delta\theta}\right) \quad (17)$$

$$= \tan^{-1}\left(\frac{\frac{\sin\angle\Phi}{\cos\angle\Phi}\cos\Delta\theta - \sin\Delta\theta}{\frac{\sin\angle\Phi}{\cos\angle\Phi}\sin\Delta\theta + \cos\Delta\theta}\right)$$

$$= \tan^{-1}\left(\frac{\sin\angle\Phi\cos\Delta\theta - \cos\angle\Phi\sin\Delta\theta}{\cos\angle\Phi\cos\Delta\theta + \sin\angle\Phi\sin\Delta\theta}\right)$$

$$= \tan^{-1}\left\{\frac{\sin(\angle\Phi - \Delta\theta)}{\cos(\angle\Phi - \Delta\theta)}\right\}$$

$$= \tan^{-1}\{\tan(\angle\Phi - \Delta\theta)\}$$

$$= \angle\Phi - \Delta\theta$$

The equation (18) is derived from the equation (17).

$$\Delta\theta = \angle\Phi - \angle\Phi' \quad (18)$$

In the equation (18), assuming that the true phase $\angle\Phi$ of the armature interlinked magnetic flux is "0", the rotor position error $\Delta\theta$ is given by the equation (19) below.

$$\Delta\theta = -\angle\Phi \quad (19)$$

The rotor position error calculation device 12 calculates the rotor position error $\Delta\theta$ through calculation according to the equation (19). The rotor position error $\Delta\theta$ is added to the origin correction value $\theta'$ offset of the position detection device 15, so that the rotor position error is corrected.

As described above, unlike the synchronous machine control apparatus disclosed in Patent Document 1, the synchronous machine control apparatus 1 according to Embodiment 1 makes it possible to correct a rotor position error without taking a time for searching a current command value. Moreover, unlike the synchronous machine control apparatus disclosed in Patent Document 2, the synchronous machine control apparatus 1 according to Embodiment 1 does not require any dedicated circuit for correcting a rotor position error.

Embodiment 2

Next, a synchronous machine control apparatus according to Embodiment 2 will be explained. In the foregoing synchronous machine control apparatus 1 according to Embodiment 1, a rotor position error is corrected based on the assumption that based on the assumption that the true phase $\angle\Phi$ of the armature interlinked magnetic flux can be regarded as "0". However, because it cannot necessarily be assumed that $\angle\Phi$ is "0", the accuracy of correcting a rotor position error may be deteriorated. In contrast, when the current command values are set in such a way that the true phase $\angle\Phi$ of the armature interlinked magnetic flux can be regarded as "0", the accuracy of correcting a rotor position error is raised. Considering the foregoing fact, the current command values are set in such a way that $\angle\Phi$ can be regarded as "0" in a synchronous machine control apparatus according to Embodiment 2.

Figure 4:
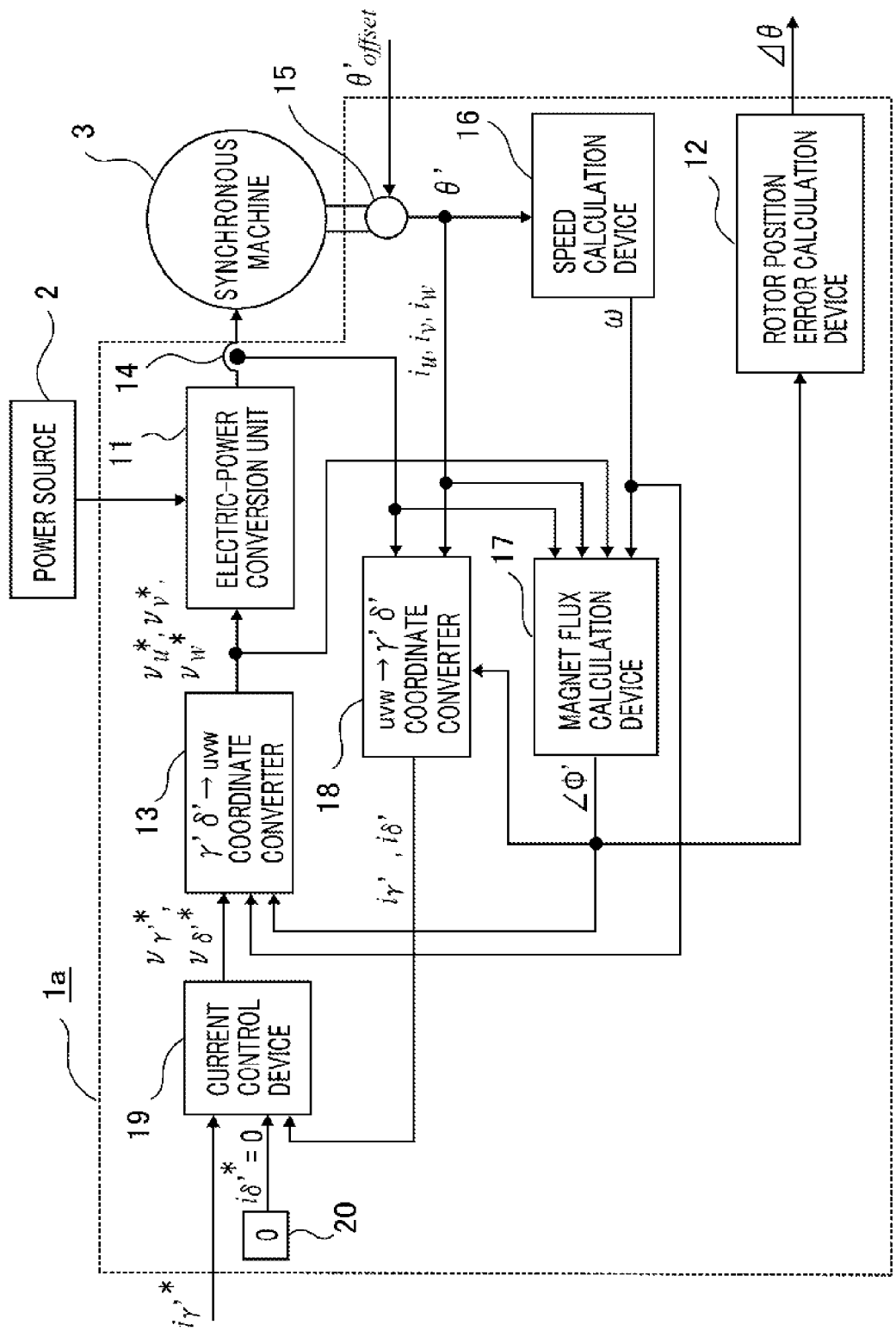
FIG. 4 is a configuration diagram illustrating an example of synchronous machine control system including a synchronous machine control apparatus, a power source, and a synchronous machine, according to Embodiment 2 of the present invention.

FIG. 4 is a diagram illustrating a synchronous machine control system including a synchronous machine control apparatus 1a according to Embodiment 2, a power source 2, and a synchronous machine 3. The configuration of the synchronous machine control apparatus 1a according to Embodiment 2 is almost the same as that of the synchronous machine control apparatus 1 according to Embodiment 1; however, the configuration of the synchronous machine control apparatus 1a is different from that of the synchronous machine control apparatus 1 in that a numerical value storage device 20 is added and in that the numerical value storage device 20 fixes the input signal i$\delta'$* of the current control device 19 to be zero.

The equation (20) is derived from the equation (17).

$$\angle\Phi = \angle\Phi' + \Delta\theta \quad (20)$$

As can be seen from FIG. 3, the $\gamma\delta$ axis is advance by $\angle\Phi$ from the dq axis. In contrast, the $\gamma'\delta'$ axis is advance by $(\Delta\theta + \angle\Phi')$ from the dq axis. Therefore, when the equation (20) is established, the $\gamma\delta$ axis and the $\gamma'\delta'$ axis coincide with each other and the equation (21) below is established.

$$\begin{cases} i_{\gamma'} = i_\gamma \\ i_{\delta'} = i_\delta \end{cases} \quad (21)$$

Thus, in the case where a δ'-axis current command value Iδт* is set to "0" and a δ'-axis current detection value Iδ' is controlled in such a way as to become "0", the δ-axis current detection value Iδ becomes "0" and hence ∠Φ can be regarded as "0".

As described above, in the synchronous machine control apparatus 1a according to Embodiment 2, ∠Φ can be regarded as "0"; therefore, in comparison with the synchronous machine control apparatus 1 according to Embodiment 1, the accuracy of correcting a rotor position error is raised.

Embodiment 3

Next, a synchronous machine control apparatus according to Embodiment 3 will be explained. In the foregoing synchronous machine control apparatus 1a according to Embodiment 2, a rotor position error is corrected with the δ'-axis current command value Iδ * fixed to "0". However, in the case where when a rotor position error has been corrected and the synchronous machine control apparatus 1a is being operated with iδ'* set to non-zero, the mounting position of the position detection device 15 is displaced and hence the rotor position error changes, it is not made possible to detect and correct the change in the rotor position error. In this regard, however, in the case where the true phase ∠Φ of the armature interlinked magnetic flux is calculated without setting the δ'-axis current command value iδ'* to "0" and then the rotor position error Δθ is calculated through the equation (18), the accuracy of correcting the rotor position error can be raised in comparison with the synchronous machine control apparatus 1 according to Embodiment 1.

Unlike the synchronous machine control apparatus 1a according to Embodiment 2, a rotor position error can be corrected even when Iδ'* is set to non-zero. Considering the foregoing fact, in a synchronous machine control apparatus according to Embodiment 3, the value of the true phase ∠Φ of the armature interlinked magnetic flux is calculated and then the rotor position error Δθ is calculated through the equation (18).

Figure 5:
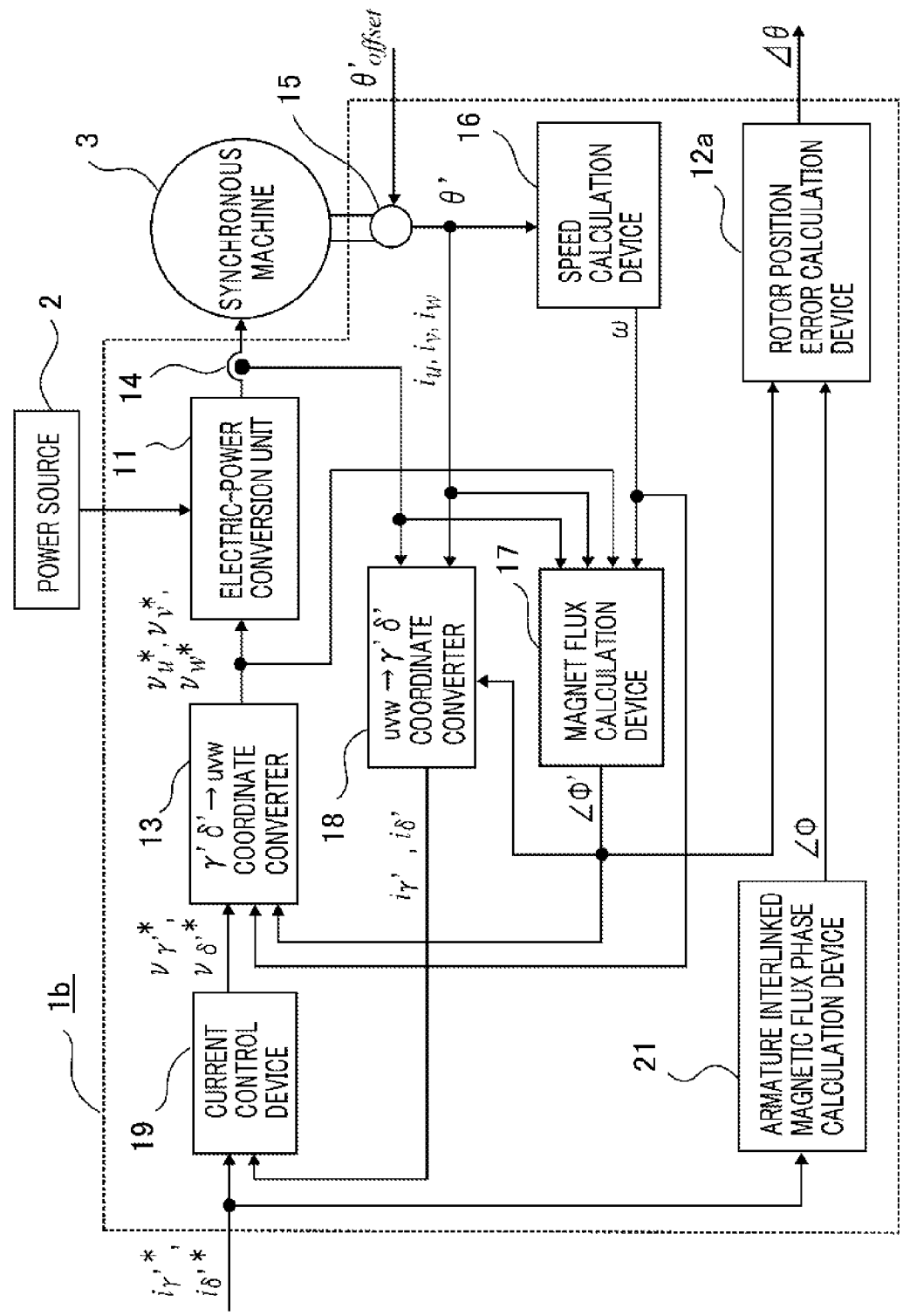
FIG. 5 is a configuration diagram illustrating an example of synchronous machine control system including a synchronous machine control apparatus, a power source, and a synchronous machine, according to Embodiments 3 and 4 of the present invention.

FIG. 5 is a diagram illustrating a synchronous machine control system including a synchronous machine control apparatus 1b according to Embodiment 3, a power source 2, and a synchronous machine 3. The configuration of the synchronous machine control apparatus 1b according to Embodiment 3 is almost the same as that of the synchronous machine control apparatus 1 according to Embodiment 1; however, the configuration of the synchronous machine control apparatus 1b is different from that of the synchronous machine control apparatus 1 in that an armature interlinked magnetic flux phase calculation device 21 is added and in that as the input signal of a rotor position error calculation device 12a, the true phase ∠Φ of the armature interlinked magnetic flux is added.

The armature interlinked magnetic flux phase calculation device 21 calculates the true phase ∠Φ of the armature interlinked magnetic flux from γ'δ' current command values iγ'* and iδ'*. As represented in the equations (9) and (10), the value of ∠Φ is expressed as a function of a plurality of parameters such as the dq-axis voltage command values vγ*, vδ* and the dq-axis current detection values id and iq; however, the armature interlinked magnetic flux phase calculation device 21 is realized in a formation of a table or an equation in such a way that instead of calculating the value of ∠Φ as a function of these parameters, ∠Φ is regarded as a value that changes depending on the γ'δ'-axis current command values iγ'* and iδ'* and when the γδ-axis current command values iγ* and iδ* are inputted, the value of ∠Φ is outputted. The table or the equation is preliminarily created based on an analysis and an actual measurement. As represented in the equation (20), the γδ axis and the γ'δ' axis coincide with each other; therefore, when the armature interlinked magnetic flux phase calculation device 21 is realized in such a manner as described above, the true phase ∠Φ of the armature interlinked magnetic flux can be calculated from γ'δ' current command values iγ'* and iδ'*. Then, through calculation according to the equation (22), the rotor position error calculation device 12 calculates the rotor position error Δθ from the true phase ∠Φ of the armature interlinked magnetic flux and the phase ∠Φ' of the estimated interlinked magnetic flux.

$$\Delta\theta = \angle\Phi - \angle\Phi' \quad (22)$$

As described above, in the synchronous machine control apparatus 1b according to Embodiment 3, in comparison with the synchronous machine control apparatus 1 according to Embodiment 1, the accuracy of correcting a rotor position error can be raised. Unlike the synchronous machine control apparatus 1a according to Embodiment 2, the rotor position error Δθ can be calculated even when Iδ' is set to non-zero; therefore, even in the case where when a rotor position error has been corrected and the synchronous machine control apparatus 1b is being operated with iδ'* set to non-zero, the mounting position of the position detection device 15 is displaced, it is not made possible to correct the rotor position error.

Embodiment 4

Next, a synchronous machine control apparatus according to Embodiment 4 will be explained. In the respective synchronous machine control apparatuses 1, 1a, and 1b according to Embodiments 1 through 3, described above, the magnetic flux calculation device 17 calculates the phase ∠Φ' of the estimated armature interlinked magnetic flux by use of the dq-axis voltage command values vd'* and vq'*, instead of the d'q'-axis actual voltages vd' and vq'. The foregoing method is performed under the assumption that there exists no difference between the d'q'-axis voltage command values vd'* and vq'* and the d' q'-axis actual voltages vd' and vq'; however, in fact, the effect of an error in the voltage output (e.g., a voltage error caused by the dead time of the inverter) of the electric-power conversion unit 11 may occur in a region where the absolute value of the line-to-line voltage is small.

Considering the foregoing fact, the synchronous machine control apparatus according to Embodiment 4 implements the operation of calculating the rotor position error Δθ, performed by the rotor position error calculation device 12 or 12a described in each of Embodiments 1 through 3, only when the line-to-line voltage is the same as or larger than a predetermined value or only when the absolute value of the electric angular velocity ω of the synchronous machine 3 is the same as or larger than a predetermined value.

The configuration of the synchronous machine control apparatus according to Embodiment 4 is the same as that of the synchronous machine control apparatus 1b according to Embodiment 3, explained with reference to FIG. 5. In the synchronous machine control apparatus 1b according to Embodiment 4, the rotor position error calculation device 12a performs calculation processing of the rotor position error Δθ only when the line-to-line voltage satisfies the condition given by the equation (23) below.

$$V_{rms} \geq V_{min} \quad (23)$$

The line-to-line voltage Vrms in the equation (23) is determined by the equation (24) below, by use of the d'q'-axis voltage command values vd'* and vq'*.

$$V_{rms} = \sqrt{v_{d'}^2 + v_{q'}^2} \quad (24)$$

In the equation (23), Vmin denotes the voltage lower limit in the calculation of a rotor position error and is determined, for example, by the equation (25) below.

$$V_{min} = \alpha_{vmin} \cdot V_{td} \quad (25)$$

In the equation (25), αvmin denotes the voltage lower limit in the calculation of a rotor position error. Vtd denotes a voltage error approximate value caused by the dead time of the inverter and is expressed by the equation (26) below.

$$V_{td} = t_d f_c \cdot V_{pn} \quad (26)$$

In the equation (26), td, fc, and Vpn denote the dead time of the inverter, the carrier frequency of the PWM (pulse Width Modulation), and the DC voltage supplied by the power source 2, respectively. When αv in the equation (25) is set to be larger than 1, the rotor position error Δθ can be calculated under the condition that the absolute value of vd'* or vq'* is larger than the voltage error caused by the dead time.

When being restricted by the absolute value of the electric angular velocity ω instead of the line-to-line voltage, the calculation of the rotor position error Δθ is performed only in the case where ω satisfies the equation (27) below.

$$|\omega| \geq \omega_{min} \quad (27)$$

In the equation (27), ωmin denotes the electric angular velocity lower limit in the calculation of a rotor position error and is determined, for example, by the equation (28) below.

$$\omega_{min} = \alpha_{wmin} \cdot \frac{V_{td}}{\Phi_m} \quad (28)$$

In the equation (28), αWmin denotes the electric angular velocity lower limit coefficient in the calculation of a rotor position error, and Φm denotes the permanent-magnet magnetic flux. When αw in the equation (28) is set to be larger than 1, the rotor position error Δθ can be calculated with the electric angular velocity ω at which the line-to-line voltage is larger than the voltage error caused by the dead time.

As described above, the synchronous machine control apparatus 1b according to Embodiment 4 implements the operation of calculating the rotor position error Δθ, only when the line-to-line voltage is the same as or larger than a predetermined value or only when the absolute value of the electric angular velocity ω of the synchronous machine 3 is the same as or larger than a predetermined value; therefore, the effect of a voltage output error in the electric-power conversion unit 11 can be reduced. Thus, in comparison with each of the respective synchronous machine control apparatuses 1, 1a, and 1b according to Embodiments 1 through 3, the accuracy of correcting a rotor position error can be raised.

Embodiment 5

Next, a synchronous machine control apparatus according to Embodiment 5 will be explained. Because the d'q'-axis current detection values id' and iq' are affected by noise included in the current detection values detected by the current detection unit 14, the d'q'-axis voltage command values vd'* and vq'* calculated by use of the current detection values are also affected by the noise. Accordingly, the phase ∠Φ' of the estimated armature interlinked magnetic flux calculated from vd'*, id', and iq' is also affected by the noise. This noise may deteriorate the accuracy of correcting a rotor position error. However, in the case where the noise components can be eliminated by a low-pass filter, the accuracy of correcting a rotor position error can be raised.

Considering the foregoing fact, in the synchronous machine control apparatus according to Embodiment 5, a low-pass filter for eliminating noise included in the current detection unit 14 is added.

Figure 6:
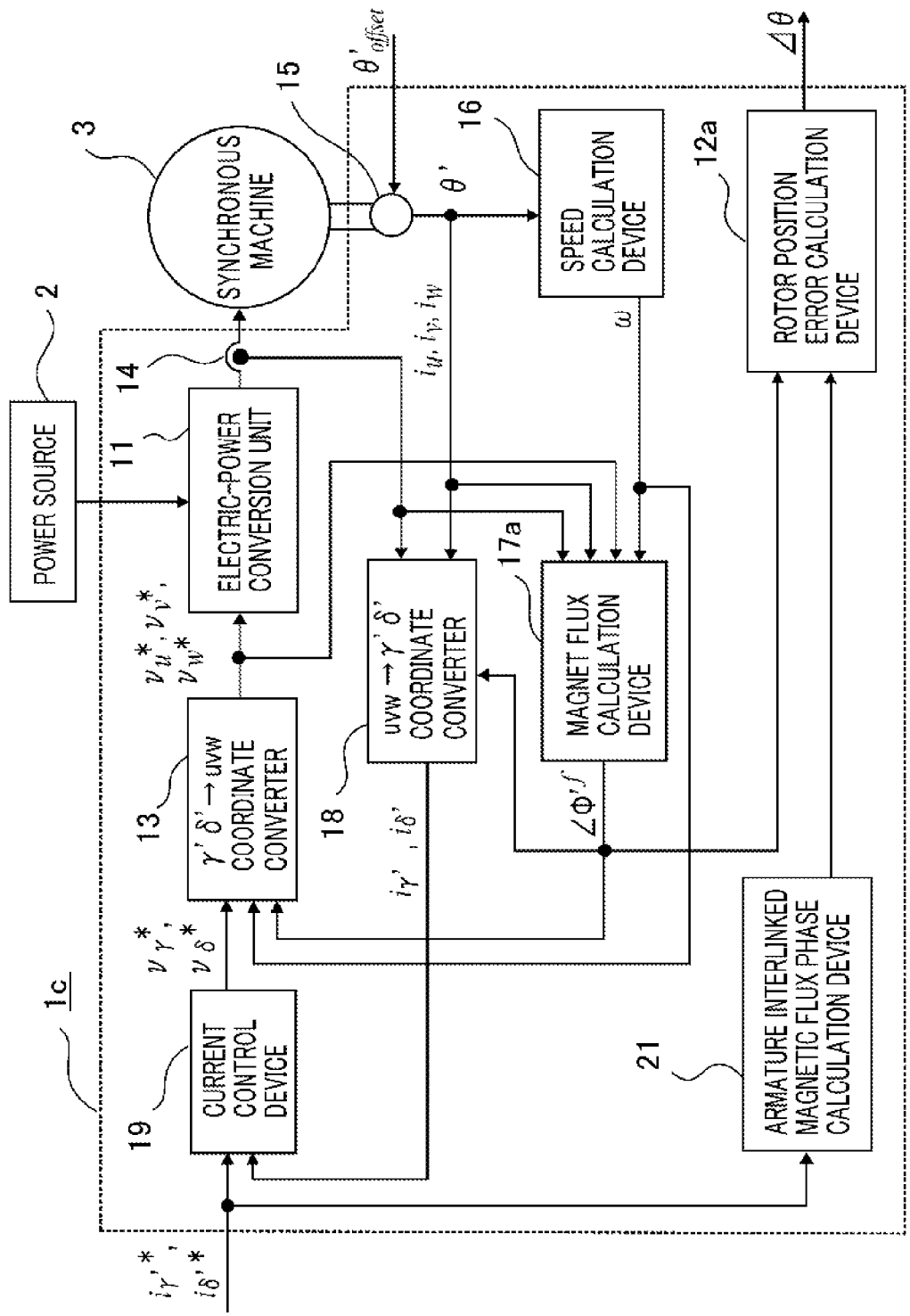
FIG. 6 is a configuration diagram illustrating an example of synchronous machine control system including a synchronous machine control apparatus, a power source, and a synchronous machine, according to Embodiment 5 of the present invention.

FIG. 6 is a diagram illustrating a synchronous machine control system including a synchronous machine control apparatus 1c according to Embodiment 5, a power source 2, and a synchronous machine 3.

The configuration of the synchronous machine control apparatus 1c according to Embodiment 5 is the same as that of the synchronous machine control apparatus 1b according to Embodiment 3; however, the configuration of a magnetic flux calculation device 17a is different from that of the magnetic flux calculation device 17.

Figure 7:
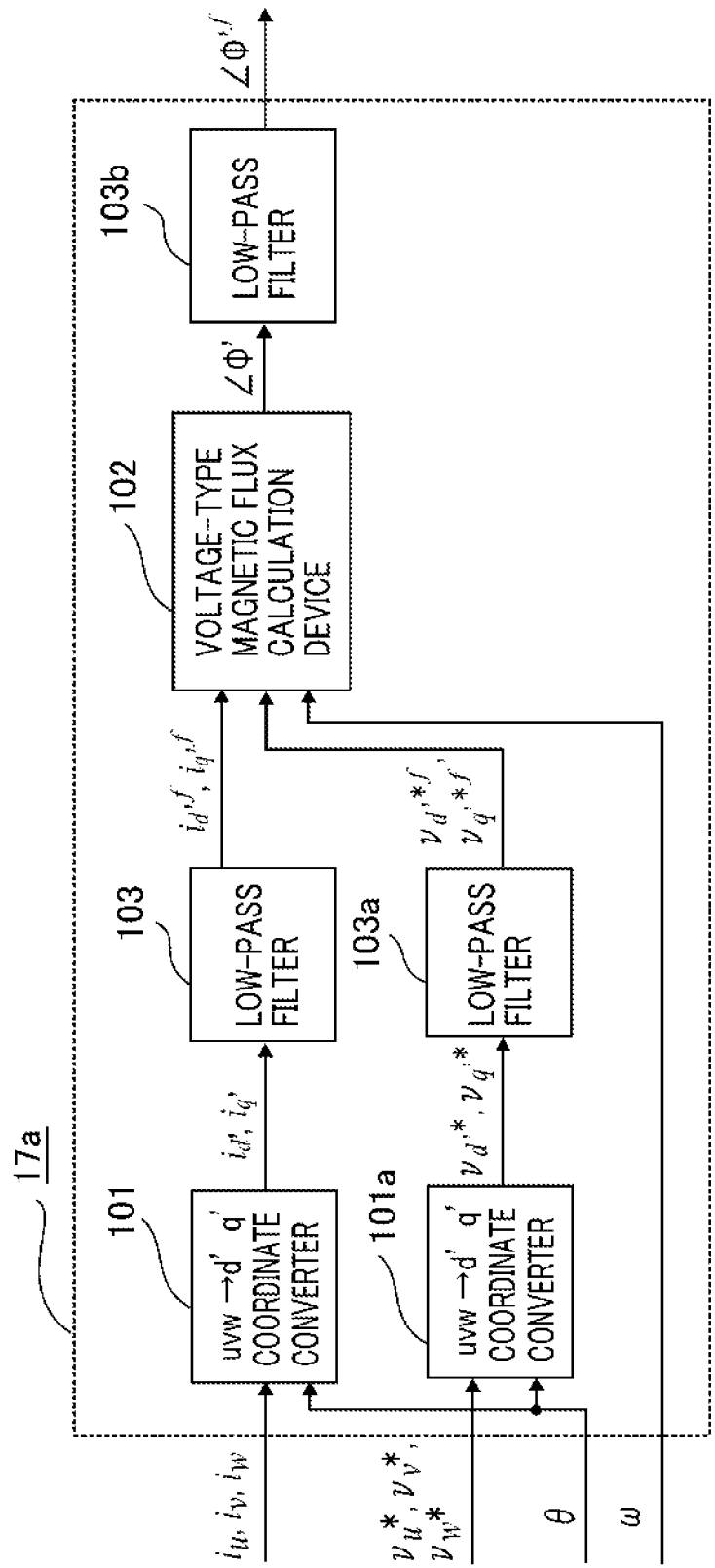
FIG. 7 is a diagram illustrating an example of configuration of a magnetic flux calculation device according to Embodiment 5 of the present invention.

FIG. 7 is an example of configuration diagram of the magnetic flux calculation device 17a according to Embodiment 5. The configuration of the magnetic flux calculation device 17a in FIG. 7 is almost the same as that of the magnetic flux calculation device 17 in FIG. 2; however, the configuration of the magnetic flux calculation device 17a is different from that of the magnetic flux calculation device 17 in that low-pass filters 103, 103a, and 103b are added therein.

The low-pass filter 102 applies low-pass filtering processing to the d'q'-axis current detection values id' and iq' so as to output filtered d'q'-axis current detection values id'f and iq'f. The low-pass filter 103a applies low-pass filtering processing to the d'q'-axis voltage command values vd'* and vq'* so as to output filtered d'q'-axis voltage command values vd'*f and vq'*f. The low-pass filter 103b applies low-pass filtering processing to the phase ∠Φ' of the estimated armature interlinked magnetic flux so as to output filtered phase ∠Φ'f of the estimated armature interlinked magnetic flux.

As described above, in the synchronous machine control apparatus 1c according to Embodiment 5, noise included in the current detection values is eliminated by the low-pass filters 103, 103a, and 103b; therefore, the phase ∠Φ' of the estimated armature interlinked magnetic flux is not affected by the noise. Thus, in comparison with each of the respective synchronous machine control apparatuses 1, 1a, and 1b according to Embodiments 1 through 4, the accuracy of correcting a rotor position error is raised.

Various modifications and alterations of this invention will be apparent to those skilled in the art without departing from the scope and spirit of this invention, and it should be understood that this is not limited to the illustrative embodiments set forth herein.

Expression 1

$$\begin{pmatrix} v_{d'}^* \\ v_{q'}^* \end{pmatrix} = \begin{pmatrix} \cos\theta' & \sin\theta' \\ -\sin\theta' & \cos\theta' \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} v_u^* \\ v_v^* \\ v_w^* \end{pmatrix} \quad (1)$$

Expression 2

$$\begin{pmatrix} i_{d'} \\ i_{q'} \end{pmatrix} = \begin{pmatrix} \cos\theta' & \sin\theta' \\ -\sin\theta' & \cos\theta' \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} i_u \\ i_v \\ i_w \end{pmatrix} \quad (2)$$

Expression 3

$$\begin{cases} \Phi_{d'} = \dfrac{1}{\omega}(v_{q'}^* - Ri_{q'}) \\ \Phi_{q'} = -\dfrac{1}{\omega}(v_{d'}^* - Ri_{d'}) \end{cases} \quad (3)$$

Expression 4

$$\angle\Phi' = \tan^{-1}\left(\dfrac{\Phi_{q'}}{\Phi_{d'}}\right) \quad (4)$$

Expression 5

$$\begin{pmatrix} i_{\gamma'} \\ i_{\delta'} \end{pmatrix} = \begin{pmatrix} \cos(\theta' + \angle\Phi') & \sin(\theta' + \angle\Phi') \\ -\sin(\theta' + \angle\Phi') & \cos(\theta' + \angle\Phi') \end{pmatrix} \begin{pmatrix} \sqrt{\dfrac{2}{3}} & -\dfrac{1}{\sqrt{6}} & -\dfrac{1}{\sqrt{6}} \\ 0 & -\dfrac{1}{\sqrt{2}} & -\dfrac{1}{\sqrt{2}} \end{pmatrix} \begin{pmatrix} i_u \\ i_v \\ i_w \end{pmatrix} \quad (5)$$

Expression 6

$$\begin{cases} v_{\gamma'}^* = \left(K_{p\gamma'} + \dfrac{K_{i\gamma'}}{s}\right)(i_{\gamma'}^* - i_{\gamma'}) \\ v_{\delta'}^* = \left(K_{p\delta'} + \dfrac{K_{i\delta'}}{s}\right)(i_{\delta'}^* - i_{\delta'}) \end{cases} \quad (6)$$

Expression 7

$$\begin{pmatrix} v_u^* \\ v_v^* \\ v_w^* \end{pmatrix} = \begin{pmatrix} \sqrt{\dfrac{2}{3}} & 0 \\ -\dfrac{1}{\sqrt{6}} & \dfrac{1}{\sqrt{2}} \\ -\dfrac{1}{\sqrt{6}} & -\dfrac{1}{\sqrt{2}} \end{pmatrix} \begin{pmatrix} \cos(\theta' + \angle\Phi') & -\sin(\theta' + \angle\Phi') \\ \sin(\theta' + \angle\Phi') & \cos(\theta' + \angle\Phi') \end{pmatrix} \begin{pmatrix} v_{\gamma'}^* \\ v_{\delta'}^* \end{pmatrix} \quad (7)$$

Expression 8

$$\Delta\theta = \theta' - \theta \quad (8)$$

Expression 9

$$\angle\Phi' = \tan^{-1}\left(-\dfrac{v_{d'}^* - Ri_{d'}}{v_{q'}^* - Ri_{q'}}\right) \quad (9)$$

Expresssion 10

$$\begin{cases} v_{d'}^* = v_d^*\cos\Delta\theta + v_q^*\sin\Delta\theta \\ v_{q'}^* = -v_d^*\sin\Delta\theta + v_q^*\cos\Delta\theta \end{cases} \quad (10)$$

Expression 11

$$\begin{cases} i_{d'}^* = i_d^*\cos\Delta\theta + i_q^*\sin\Delta\theta \\ i_{q'}^* = -i_d^*\sin\Delta\theta + i_q^*\cos\Delta\theta \end{cases} \quad (11)$$

Expression 12

$$\angle\Phi = \tan^{-1}\left(\dfrac{\Phi_q}{\Phi_d}\right) \quad (12)$$

Expression 13

$$\begin{cases} \Phi_d = \dfrac{1}{\omega}(v_q^* - Ri_q) \\ \Phi_q = -\dfrac{1}{\omega}(v_d^* - Ri_d) \end{cases} \quad (13)$$

Expression 14

$$\angle\Phi' = \tan^{-1}\left\{\dfrac{(v_d^* - Ri_d)\cos\Delta\theta + (v_q^* - Ri_q)\sin\Delta\theta}{-(v_d^* - Ri_d)\sin\Delta\theta + (v_q^* - Ri_q)\cos\Delta\theta}\right\} \quad (14)$$

$$= \tan^{-1}\left\{\dfrac{-\dfrac{1}{\omega}(v_d^* - Ri_d)\cos\Delta\theta - \dfrac{1}{\omega}(v_q^* - Ri_q)\sin\Delta\theta}{-\dfrac{1}{\omega}(v_d^* - Ri_d)\sin\Delta\theta + \dfrac{1}{\omega}(v_q^* - Ri_q)\cos\Delta\theta}\right\}$$

Expression 15

$$\angle\Phi' = \tan^{-1}\left(\dfrac{\Phi_q\cos\Delta\theta - \Phi_d\sin\Delta\theta}{\Phi_q\sin\Delta\theta + \Phi_d\cos\Delta\theta}\right) \quad (15)$$

$$= \tan^{-1}\left(\dfrac{\dfrac{\Phi_q}{\Phi_d}\cos\Delta\theta - \sin\Delta\theta}{\dfrac{\Phi_q}{\Phi_d}\sin\Delta\theta + \cos\Delta\theta}\right)$$

Expression 16

$$\dfrac{\Phi_q}{\Phi_d} = \tan\angle\Phi \quad (16)$$

Expression 17

$$\angle\Phi' = \tan^{-1}\left(\dfrac{\tan\angle\Phi\cos\Delta\theta - \Phi_d\sin\Delta\theta}{\tan\angle\Phi\sin\Delta\theta + \Phi_d\cos\Delta\theta}\right) \quad (17)$$

$$= \tan^{-1}\left(\dfrac{\dfrac{\sin\angle\Phi}{\cos\angle\Phi}\cos\Delta\theta - \sin\Delta\theta}{\dfrac{\sin\angle\Phi}{\cos\angle\Phi}\sin\Delta\theta + \cos\Delta\theta}\right)$$

$$= \tan^{-1}\left(\dfrac{\sin\angle\Phi\cos\Delta\theta - \cos\angle\Phi\sin\Delta\theta}{\cos\angle\Phi\cos\Delta\theta + \sin\angle\Phi\sin\Delta\theta}\right)$$

$$= \tan^{-1}\left\{\dfrac{\sin(\angle\Phi - \Delta\theta)}{\cos(\angle\Phi - \Delta\theta)}\right\}$$

$$= \tan^{-1}\{\tan(\angle\Phi - \Delta\theta)\}$$

$$= \angle\Phi - \Delta\theta$$

Expression 18

$$\Delta\theta = \angle\Phi - \angle\Phi' \quad (18)$$

Expression 19

$$\Delta\theta = -\angle\Phi' \quad (19)$$

Expression 20

$$\angle\Phi = \angle\Phi' + \Delta\theta \quad (20)$$

Expression 21

$$\begin{cases} i_{\gamma'} = i_{\gamma} \\ i_{\delta'} = i_{\delta} \end{cases} \quad (21)$$

Expression 22

$$\Delta\theta = \angle\Phi - \angle\Phi' \quad (22)$$

Expression 23

$$V_{rms} \geq V_{min} \quad (23)$$

Expression 24

$$V_{rms} = \sqrt{v_{d'}^2 + v_{q'}^2} \quad (24)$$

Expression 25

$$V_{min} = \alpha_{vmin} \cdot V_{td} \quad (25)$$

Expression 26

$$V_{td} = t_d \cdot f_c \cdot V_{pn} \quad (26)$$

Expression 27

$$|\omega| \geq \omega_{min} \quad (27)$$

Expression 28

$$\omega_{min} = \alpha_{wmin} \cdot \frac{V_{ld}}{\Phi_m} \quad (28)$$

What is claimed is:

1. A synchronous machine control apparatus for correcting a first rotor position error that is a difference between a rotor position of a synchronous machine and a rotor position detected by a position detection unit for detecting the rotor position of the synchronous machine, the synchronous machine control apparatus comprising:
   a current control device for performing control in such a way that respective current command values and respective current detection values in a generation direction of an armature interlinked magnetic flux and in a direction perpendicular to the generation direction of the armature interlinked magnetic flux coincide with each other;
   a magnetic flux calculation device for estimating the armature interlinked magnetic flux and calculating a phase of the estimated armature interlinked magnetic flux, based on an armature current detection value of the synchronous machine and an armature voltage command value therefor; and
   a rotor position error calculation device for calculating a second rotor position error based on the phase of the estimated armature interlinked magnetic flux calculated by the magnetic flux calculation device and correcting the first rotor position error that is the difference between the rotor position of the synchronous machine and the rotor position detected by the position detection unit based on the second rotor position error calculated by the rotor position error calculation device.

2. The synchronous machine control apparatus according to claim 1, wherein the rotor position error calculation device performs an operation of calculating the second rotor position error, only when one of the current command values in the direction perpendicular to the generation direction of the armature interlinked magnetic flux is 0.

3. The synchronous machine control apparatus according to claim 1, further comprising an armature interlinked magnetic flux calculation device for calculating a true phase of the armature interlinked magnetic flux based on the respective current command values in the generation direction of the armature interlinked magnetic flux and in the direction perpendicular to the generation direction of the armature interlinked magnetic flux, wherein the rotor position error calculation device further calculates the second rotor position error based on the true phase of the armature interlinked magnetic flux.

4. The synchronous machine control apparatus according to claim 1, wherein the rotor position error calculation device performs an operation of calculating the second rotor position error, only when a line-to-line voltage calculated based on one of the current command values in the generation direction of the armature interlinked magnetic flux and one of the current command values in the direction perpendicular to the generation direction of the armature interlinked magnetic flux is the same as or larger than a line-to-line voltage lower limit value.

5. The synchronous machine control apparatus according to claim 1, wherein the rotor position error calculation device performs an operation of calculating the second rotor position error, only when an electric angular velocity of the synchronous machine is the same as or larger than an electric angular velocity lower limit value.

6. The synchronous machine control apparatus according to claim 1, further comprising a low-pass filter for applying low-pass filtering processing to at least one of the armature current detection value, the armature voltage command value, and the phase of the estimated armature interlinked magnetic flux.

* * * * *